(12) United States Patent
Prey

(10) Patent No.: US 6,411,707 B1
(45) Date of Patent: Jun. 25, 2002

(54) CIRCUIT ARRANGEMENT AND METHOD FOR ANNOUNCEMENT CONTROL

(75) Inventor: Andreas Prey, Ottobrunn (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/160,840

(22) Filed: Sep. 25, 1998

(30) Foreign Application Priority Data

Sep. 26, 1997 (DE) .......................................... 197 42 579

(51) Int. Cl.⁷ ............................ H04M 1/67; H04M 3/00
(52) U.S. Cl. .................. 379/265.11; 379/67.1; 379/76; 379/84; 379/266.01; 379/267
(58) Field of Search .......................... 379/67.1, 76, 84, 379/201, 203, 210, 211, 212, 219, 221, 223, 260, 261–268, 201.01, 203.01, 207.01, 210.01, 211.01, 212.01, 221.01, 265.01–265.14, 266.01–266.08

(56) References Cited

U.S. PATENT DOCUMENTS

| | | | | |
|---|---|---|---|---|
| 4,788,715 A | * | 11/1988 | Lee .............................. | 379/84 |
| 5,181,236 A | * | 1/1993 | LaVallee et al. ............ | 379/67.1 |
| 5,271,058 A | * | 12/1993 | Andrews et al. ............. | 379/210 |
| 5,274,700 A | * | 12/1993 | Gechter et al. .............. | 379/210 |
| 5,469,504 A | * | 11/1995 | Blaha .......................... | 379/265 |
| 5,555,299 A | * | 9/1996 | Maloney et al. ............. | 379/212 |

\* cited by examiner

Primary Examiner—Allan Hoosain
(74) Attorney, Agent, or Firm—Morrison & Foerster, LLP

(57) ABSTRACT

In a circuit arrangement and method for announcement control, with a processing unit of a call distributor unit, announcements already forwarded to a caller as well as a current status of the announcement are determined and a called party is informed thereof. In response thereto, the called party can intentionally end the announcement.

7 Claims, 2 Drawing Sheets

CIRCUIT ARRANGEMENT AND METHOD FOR ANNOUNCEMENT CONTROL

BACKGROUND OF THE INVENTION

In a communication system, the subscriber who wishes, for example, to make use of a particular service is greeted by an automatic announcement when selecting the service. Given a temporary overload of the service, the caller is instructed by a waiting statement that his call has been entered into a waiting queue. This waiting announcement can be repeated n times dependent on how often the operator of the service wishes to communicate this waiting statement to the caller. After the waiting statement has sequenced n times, the caller is forwarded, for example, to a free operator location OPn. After the n time repetition of the waiting statement, the caller is assigned a main or calling tone. The ringing or calling tone is followed by an operator greeting message that instructs the caller that he is now connected to the operator location. It can thus occur that the waiting announcement is prematurely ended by allocation of the call to an operator location. If the operator does not accept the call within a specific time, the call is again entered into the waiting queue. The same announcement procedure with temporary interruption by a ringing or calling tone thus begins anew.

SUMMARY OF THE INVENTION

It is an object of the invention to specify a circuit arrangement and a method for announcement control that avoids the aforementioned disadvantages.

This object is achieved according to the invention by providing a circuit arrangement for announcement control of a first announcement potentially forwarded multiple times to a caller. A call distributor unit has a call processing unit for call acceptance and call forwarding of the caller to a called party. The call processing unit has an announcement check unit for determining a number of repetitions of a first announcement already forwarded to a caller and an announcement status of a current, forwarded first announcement. The call distributor unit forwards correspondingly communicated data to the called party so that the first announcement can be intentionally ended by the called party.

In a method of the invention for announcement control of a first announcement potentially forwarded multiple times to a caller given a call acceptance and a call forwarding of a call from the caller to the called party, a number of repetitions of the first announcement transmitted to the caller and an executive status of a current, first announcement forwarded to the caller is determined. The corresponding data is forwarded to the called party so that the called party can intentionally end the announcement.

In addition to yielding the advantage of a continuous announcement sequence without interruption by a calling or ringing tone, the invention also yields the further advantage that no undefined abort of an announcement occurs.

The invention yields the further advantage that a waiting statement and, following thereupon, an operator statement occurs after the one-time greeting of the subscriber.

The invention yields the further advantage that an operator announcement only ensues when this differs from the waiting announcement.

The invention yields the further advantage that the operator can intentionally prepare for the call since the operator location is informed of the frequency of the waiting announcements transmitted to the caller as well as of the time span of the current announcement duration of the waiting announcement.

The circuit arrangement and the method may be seen from the following, more detailed explanation of the exemplary embodiment with reference to the drawings.

DESCRIPTION OF THE PREFERRED EMBODIMENTS

Figure 1:
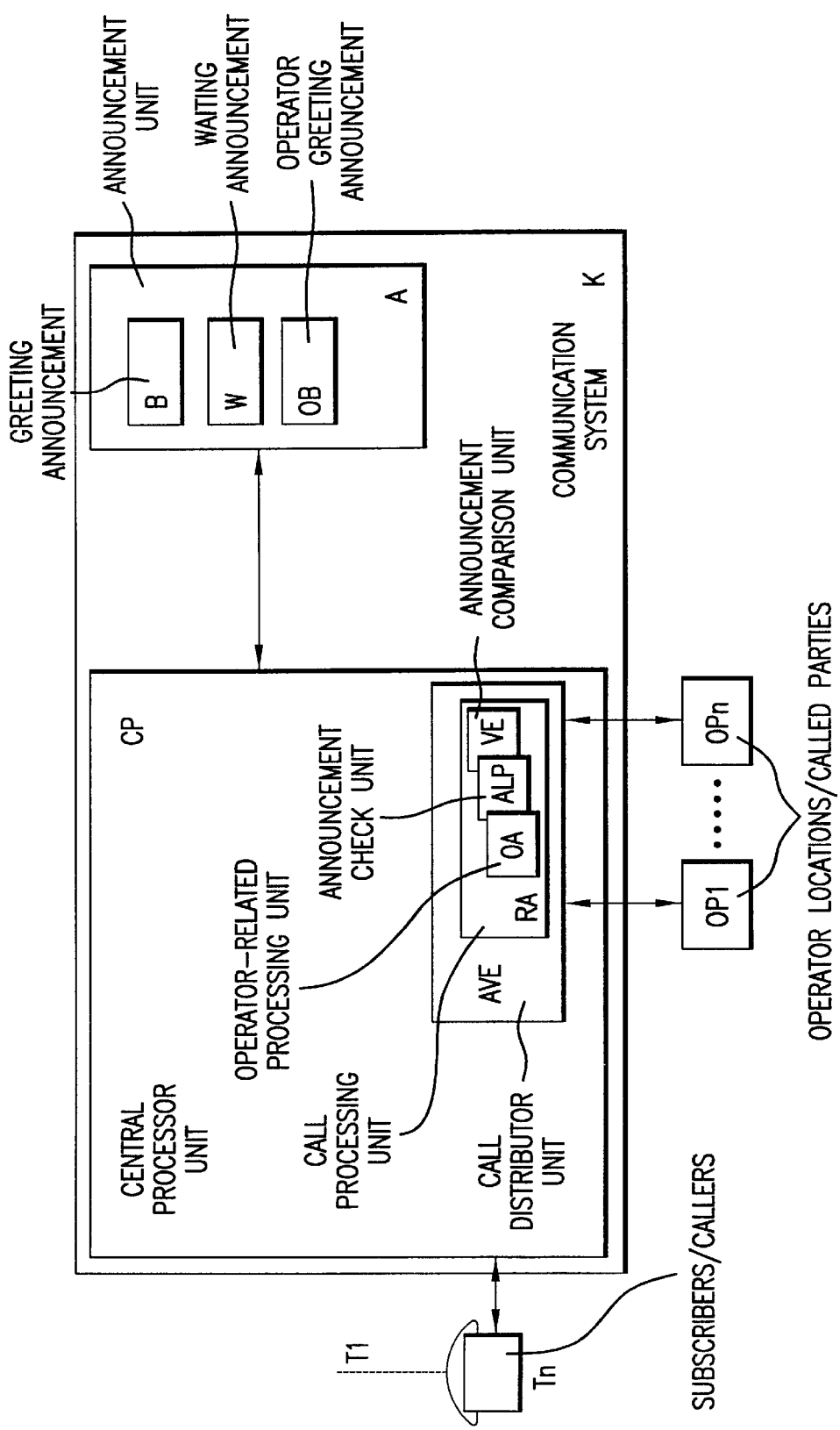
FIG. 1 is a part of a communication system with a call distribution unit.

With reference to the invention, FIG. 1 shows the critical units of a central processor unit CP, a call distributor unit AVE arranged in the central processor unit CP, an announcement unit A, as well as subscribers T1 through Tn, and operator locations OP1 through OPn that are connected to the communication system K. A call processing unit RA, an operator-related processing unit OA, an announcement check unit ALP and an announcement comparison unit VE are arranged in the call distributor unit AVE. The word sequence of the individual announcements are stored in the announcement unit A, for example in digital or analog fashion. The individual announcements are a greeting announcement B, a first announcement that is a waiting announcement W and a second announcement that is an operator greeting announcement OB. Since the subscriber Tn, who is referred to below as a caller, wishes a connection to a called party that, as already mentioned above, can be an operator location OBn, the central processor unit CP arranged in the communication system K forwards the incoming call of the caller Tn to the call distributor unit AVE. In this, a greeting message B is allocated to the caller Tn via the announcement unit A. After the greeting announcement B has ended, the waiting announcement W is forwarded to the caller Tn by the call distributor unit AVE.

During the waiting announcement W, the call distributor unit AVE checks to see whether a free operator location OPn can accept the call of the caller Tn. When a free operator location OPn is present, then the call is forwarded to the free operator location OPn.

In the call forwarding, the operator is informed that a call for processing is present. After the acceptance of the call, the operator at the operator location OPn is also informed by the announcement check unit ALP how often the waiting announcement W was already communicated to the caller Tn. Beyond this, how long the current waiting announcement W has been through-connected to the caller Tn or how long the waiting announcement W will still remain through-connected to the caller Tn is also displayed, to the operator OPn on a display. A control unit (not shown in FIG. 1) controls the data communicated from the announcement check unit ALP on the display or in a picture screen segment on a picture screen. The announcement comparison unit VE checks whether the waiting announcement W coincides with an operator greeting announcement OB following it. When this is the case, then no further announcement occurs. The caller Tn is through-connected to the called party OPn.

Figure 2:
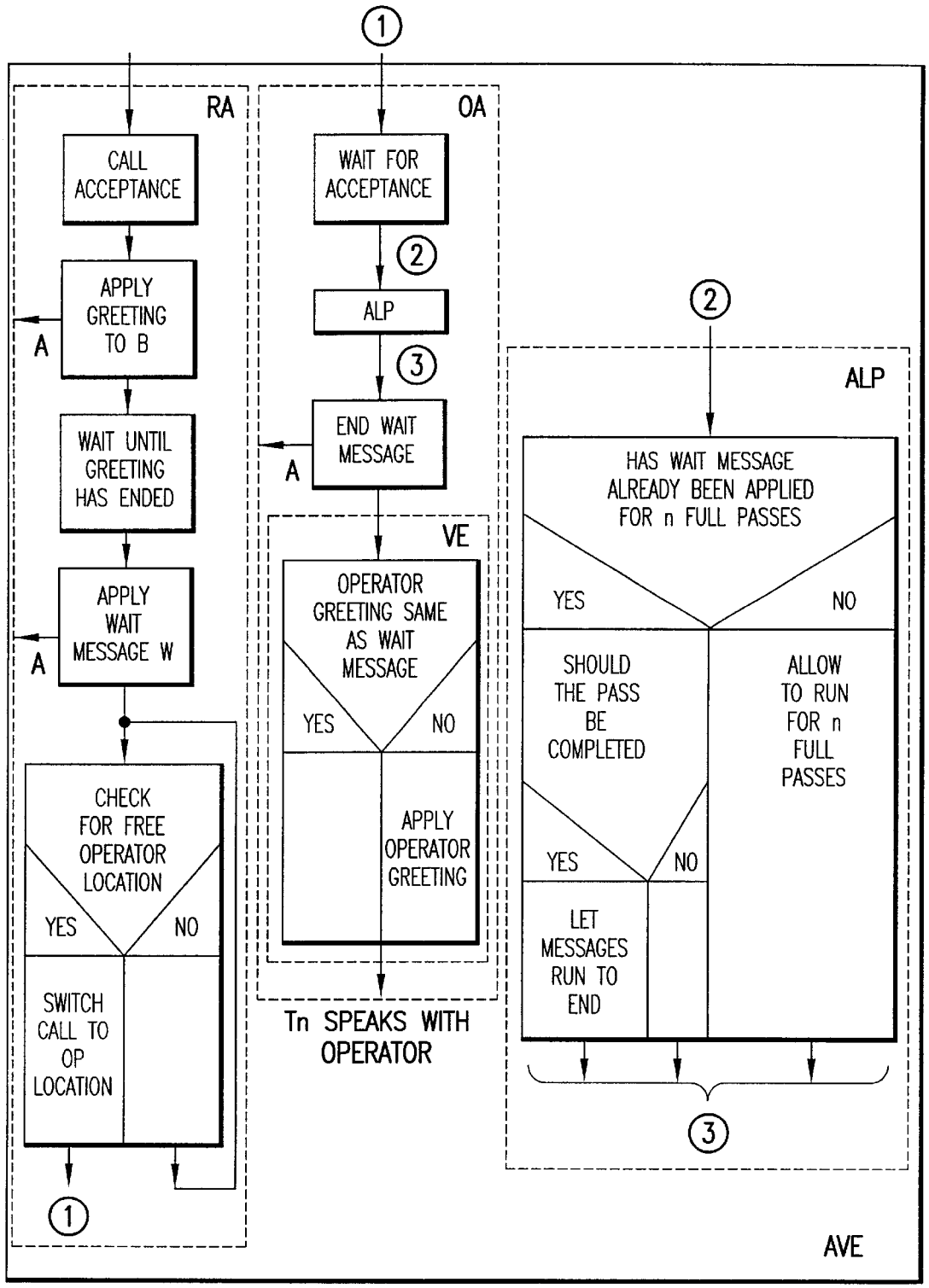
FIG. 2 is a flowchart of the announcement control.

FIG. 2 shows a flowchart that reproduces the executive sequences within the call distributor unit AVE. The call processing unit RA, the operator-related processing unit OA, the announcement check unit ALP and the announcement comparison unit VE are the critical units in this flowchart.

The incoming call of the caller Tn is accepted by the call distributor unit AVE in the call processing unit RA. Subsequently, a greeting message B is forwarded from the announcement unit A to the caller Tn and, at the same time, an entering occurs into a waiting queue in which all callers Tn are entered until they are through-connected to the operator location OPn. The greeting announcement B is communicated to the caller Tn up to the end of the announcement.

After the waiting announcement W has been applied, the call processing unit RA checks whether a free operator location OPn is available. When this is not the case, the waiting announcement W is continued n times. When a free operator location OPn is present, the call processing unit RA hands the call over to the operator location OPn. With the acceptance of the call by the operator at the operator location OPn, the vendor or operator can decide from call-to-call how often the caller Tn is provided with the waiting announcement W and the current announcement up to the end of the announcement before the operator processes the accepted call. Before the call is processed, the waiting announcement W is checked in the operator-related processing unit OA with respect to its information already communicated, being checked by the announcement check unit ALP and being communicated to the caller Tn.

The announcement check unit ALP in the operator-related processing unit OA determines, on the one hand, the frequency of the waiting announcements W and, on the other hand, the current time status of the sequenced waiting announcement W. The data determined by the announcement check unit ALP with respect to frequency of the waiting announcements W already sent to the caller and the duration of the current waiting announcement W are displayed for the respectively called party, for example on a display or on a picture screen in a picture screen segment, such as by at least one of optics and acoustics.

It can, for example, be left up to the operator prepared to process the call as to whether the waiting announcement W is aborted at predetermined points in time or whether the call acceptance is implemented no earlier than the end of the waiting announcement W. After a regular termination of the waiting announcement W, this is disconnected by the operator-related processing unit OA. Subsequently, the announcement comparison unit VE that is arranged in the operator-related processing unit OA asks whether the waiting announcement W and the operator greeting announcement OB are identical. When the two announcements are identical, then a termination of the waiting announcement W occurs and the line is through-connected to the caller. When the two announcements are not identical, then an operator greeting announcement OB occurs. This announcement can individually reference the operator location OPn as well as an operator.

Although various minor modifications might be suggested by those skilled in the art, it should be understood that my wish to embody within the scope of the patent warranted hereon all such modifications as reasonably and properly come with the scope of my contribution to the art.

I claim as my invention:

1. A circuit arrangement for announcement control of a first announcement forwarded potentially multiple times to a caller, comprising:
   a call distributor unit having a call processing unit for call acceptance and call forwarding of the caller to a called party;
   the call processing unit having an announcement check unit for determining data corresponding to a number of repetitions of a first announcement already forwarded to the caller and an announcement status indicating when a next repetition will occur of the first announcement to the caller; and
   said call distributor unit forwarding said corresponding data to the called party so that the first announcement can be intentionally ended by the called party.

2. The circuit arrangement according to claim 1 wherein, given a possibility of forwarding a second announcement independent of the first announcement, the call processing unit has a comparison unit for comparing the forwarded, first announcement and the second announcement to be forwarded, and for forwarding the second announcement to the caller after conclusion of the first announcement only given inequality of the first and second announcements.

3. The circuit arrangement according to claim 1 wherein an announcement unit is provided for storing announcements.

4. The circuit arrangement according to claim 1 wherein a control unit is provided for controlling display of data determined by the announcement check unit on at least one of a display and a picture screen segment on a picture screen at the called party.

5. A method for announcement control of a first announcement potentially forwarded to a caller given a call acceptance and a call forwarding of a call from the caller to a called party, comprising the steps of:
   determining data corresponding to a number of repetitions of the first announcement transmitted to the caller and an executive status of when a next repetition will occur of the first announcement to the caller; and
   forwarding said corresponding data to the called party so that the called party can intentionally end the announcement.

6. A method for announcement control of a first announcement potentially forwarded to a caller given a call acceptance and a call forwarding of a call from the caller to a called party, comprising the steps of:
   determining a number of repetitions of the first announcement transmitted to the caller and an executive status of a current, first announcement forwarded to the caller; and
   forwarding corresponding data to the called party so that the called party can intentionally end the announcement.

7. The method according to claim 6 wherein following a potentially repeated forwarding of the first announcement, the first announcement and a second announcement to be forwarded to the caller are compared; and the second announcement is through-connected to the caller only given inequality.

* * * * *